(12) United States Patent
Shoup (10) Patent No.: US 8,418,634 B2
(45) Date of Patent: Apr. 16, 2013

(54) VACUUM SEED METER

(76) Inventor: Kenneth E. Shoup, Kankakoo, IL (US)

( * ) Notice: Subject to any disclaimer, the term of this patent is extended or adjusted under 35 U.S.C. 154(b) by 292 days.

(21) Appl. No.: 12/800,085

(22) Filed: May 7, 2010

(65) Prior Publication Data

US 2011/0271887 A1 Nov. 10, 2011

(51) Int. Cl.
*A01C 7/046* (2006.01)
*A01C 7/081* (2006.01)
*A01C 7/12* (2006.01)
*A01C 7/128* (2006.01)

(52) U.S. Cl.
USPC .......................................... 111/182; 111/185

(58) Field of Classification Search ................... 111/170, 111/177–185
See application file for complete search history.

(56) References Cited

U.S. PATENT DOCUMENTS

| | | | |
|---|---|---|---|
| 4,145,980 A * | 3/1979 | Boots | ............................ 111/188 |
| 4,793,511 A | 12/1988 | Ankum et al. | |
| 5,170,909 A | 12/1992 | Lundie et al. | |
| 5,740,747 A | 4/1998 | Stufflebeam et al. | |
| 6,401,638 B1 | 6/2002 | Crabb et al. | |
| 6,516,733 B1 | 2/2003 | Sauder et al. | |
| 2006/0200044 A1* | 9/2006 | Freeman et al. | .............. 600/583 |

* cited by examiner

*Primary Examiner* — Christopher J. Novosad
(74) *Attorney, Agent, or Firm* — Olson & Cepuritis, Ltd.

(57) ABSTRACT

A seed meter for an agricultural seed planter, wherein the seed meter includes a rotating distributing seed disk defining a plurality of radially spaced apertures. The seed disk or drum is operatively connected to a vacuum source for creating a pressure differential between the exterior and the interior of the seed disk so as to pick up seeds for dispensing. Secured to the exterior surface of the seed disk are a plurality of arm members, which include an end portion defining an aperture that is positioned over a corresponding aperture formed about the periphery of the seed disk. As the drum is rotated through a supply of seeds, individual seeds are urged onto the apertures of the arm members and corresponding seed disk apertures, and held in place by the vacuum. A lifter mechanism mounted with a frame and including an end that engages at least the portion of the seed disk or drum defining the seed apertures causes the radial outward end of the arm members to be urged away from the surface of the seed disk as the disk is rotated relative to the end of the lifter so that the seed held on the arm member is moved away from the vacuum source and communication with the vacuum source is disrupted.

19 Claims, 10 Drawing Sheets

VACUUM SEED METER

FIELD OF THE INVENTION

The present invention generally relates to seed metering mechanisms for dispensing individual seeds at a controlled rate into a seed furrow as the seed meter is advanced above and along the furrow and, more particularly to a vacuum seed metering mechanism including an apparatus for separating the seeds from the vacuum source.

BACKGROUND OF THE INVENTION

Seed meters for dispensing seeds at a controlled rate into a seed furrow as the seed meter is advanced above and along the seed furrow have been in use for many years. In a conventional arrangement, a tractor is coupled with planting units with seed meters. The planting units generally include seed hoppers for the seeds to be planted or a smaller container fed from a centralized bin or large hopper, and a device for opening a furrow in the ground as the tractor is advanced across the field. A seed meter is connected to the seed hopper for dispensing individual seeds into the furrow at a controlled rate, and a further device for moving soil at the sides of the furrow to close the furrow over the seeds.

The tractor may move across the field at speeds of about 4 to about 8 miles per hour with spacing between the planting of seeds ranging from as little as 0.5 inches or less to as much as 10 inches or more depending upon the particular seed being planted. A seed metering mechanism must therefore be able to dispense the seeds at various rates depending on the desired spacing. In addition to being able to dispense seeds at different rates, seed meters must also account for differences in the size, shape and surfaces of seeds.

One type of seed meter is a mechanical type meter. Typical mechanical seed meters are generally limited as to the speed at which they operate and are not suitable for handling different types of seeds without cumbersome equipment changes.

Other seed meters have utilized air pressure differential, such as a vacuum to overcome some of the problems of the mechanical seed meters. Vacuum seed meters typically utilize a vacuum source coupled to a chamber on the opposite side of the seed disc from the seed hopper with the vacuum communicating through the apertures in the seed disc to the seeds.

One problem that occasionally arises with vacuum seed meters is an untimely disengagement of the seed or complete failure to disengage the seed from the aperture. This is often due to the fact that a relatively strong vacuum that is typically required to provide a sufficient pressure differential to hold the seeds within the apertures within the disc. The presence of a strong vacuum force also results in greater rotational friction of the seed meter, which requires greater workforce to operate. Smaller seeds or portions of larger seeds occasionally become lodged in the disc openings and are not timely released or released at all at the discharge area of the seed metering mechanism.

Various approaches have been used to address this problem. In U.S. Pat. No. 5,740,747, a vibration apparatus is utilized to shake the seeds from the apertures. In U.S. Pat. No. 5,170,909 a lower power vacuum is utilized with the assistance of an agitator and seed accelerator in the seed mass. Seeds are released by cutting the vacuum source from the seed. It would be desirable to provide a vacuum seed metering mechanism wherein the release of seeds from the disc is positively affected and the seeds are readily and reliably discharged from the seed metering disc and mechanism without the need for such complicated related mechanisms.

SUMMARY OF THE INVENTION

The present invention provides a vacuum seed meter that includes a rotating distributing seed disk or drum defining a plurality of radially spaced apertures. The seed disk or drum comprises an interior portion or inner chamber that is operatively connected to a vacuum source for creating an air pressure differential between the exterior and the interior of the seed disk or drum so as to pick up seeds for dispensing. Secured about a first end portion and extending radially outward to a detached second end portion of the exterior surface of the seed disk are a plurality of arm members made from a resilient, yet rigid material, such as spring steel. Formed at the second end of each of the arm members is an aperture or cut out portion. The aperture or cut out portion is positioned over a corresponding aperture formed about the periphery of the seed disk.

As the drum is rotated through a supply of seeds to be planted, individual seeds are urged onto the apertures of the arm members and corresponding seed disk apertures, and held in place by the vacuum. A lifter mechanism is mounted with a frame and includes an end that engages at least the portion of the seed disk or drum defining the seed apertures. The seed disk or drum is rotatable relative to the end of the lifter. As the seed disk is rotated, the lifter causes the radial outward end of the arm members to be urged away from the surface of the seed disk or drum. In so doing, the seed held on the arm member is moved away from the vacuum source such that communication with the vacuum source is disrupted. The seed, lacking sufficient force to be held to the end of the arm member, is then released. The lifter may optionally include a portion that also occludes the aperture in the seed disk such as a vacuum breaker plate, thereby temporarily cutting off the vacuum force from the individual seed entirely. As the vacuum increases rotational friction is not increased because there is no seal friction between the seed disk and the vacuum cutoff. As the seed disk continues to rotate, the arm members are disengaged from the lifter such that the arm members are allowed to return to the position where the apertures in the arm members and seed disk are again overlaid. This further assists in removal of any seed remnants that may exist. As the arm members return into position, the resilient arm members, in combination with the vacuum breaker plate act to dislodge any seeds or seed remnants in the apertures at the end of the arm member. As the disk or drum is rotated, an additional seed is drawn onto the seed disk or drum at the apertures.

In a preferred embodiment, the seed meter is double-sided. The vacuum source is operatively connected to the seed disk or drum about a central axis of the seed disk. The rotating seed disk comprises a plurality of apertures spaced along the peripheral outer edge portion of a first exterior side thereof. The opposite or second exterior side of the seed disk would also comprise a plurality of apertures spaced along the periphery of the outer edge portion of the second exterior surface. In a highly preferred embodiment, the apertures on one side of the seed disk are offset from the apertures on the opposite side of the seed disk. Similarly, the lift members on one side of the seed disk are circumferentially offset from the lift members on the opposite side. The end of the lifter that engages the seed disk is preferably adapted to lift the radially outward ends of the arm members on both sides of the seed disk. As discussed in the more general description of the invention, as the ends of the arm members are moved away from the seed disk or drum, the vacuum source is no longer able to hold the seed on the end of the arm member such that the seed is released.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

While particular embodiments of the present invention have been shown and described, it will be appreciated by those skilled in the art that changes, modifications and improvements may be made without departing from the true spirit and scope of the invention.

Figure 1:
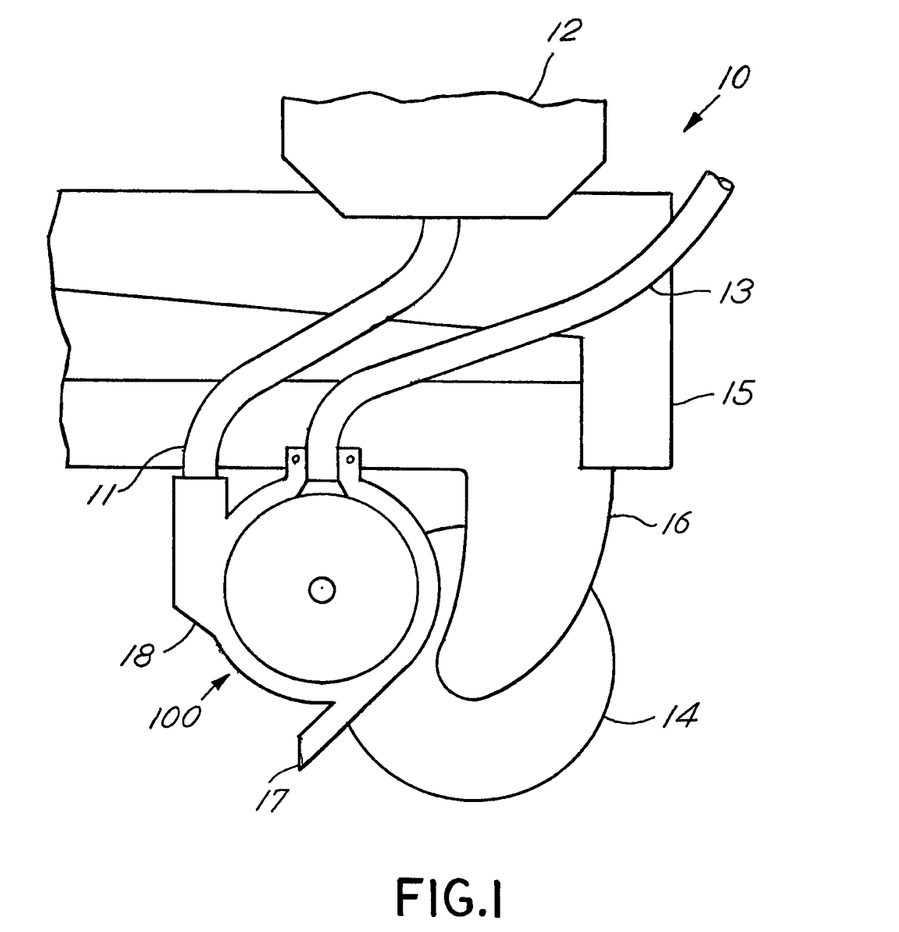
FIG. 1 is a schematic right side elevational view of a planting unit with a vacuum seed meter in accordance with a preferred embodiment of the invention.

Shown in FIG. 1 is a schematic right side elevational view of planting unit 10, including vacuum seed meter disk assembly 100. Planting unit 10 includes seed hopper 12 connected to seed tube 11. Seed tube 11 is connected to seed meter disk assembly 100. Seed meter disk assembly 100 is encased within assembly cover 18. Assembly cover 18 includes seed dispensing tube 17. Connected to seed meter disk assembly 100 is vacuum tube 13. Vacuum tube 13 is connected to a vacuum source (not shown). Seed meter disk assembly 100 is mounted to subunit frame 16. Also mounted to subunit frame 16 is furrow opening disk 14. Subunit frame 16 is connected to row unit frame 15. Row unit frame 15 is connected to a tractor (not shown). As known in the art, planting unit 10, is used to regularly and uniformly dispense seeds on the ground. Planting unit 10 is attached to and towed by a tractor (not shown). A plurality of planting units, similar to planting unit 10, may be simultaneously connected to a tractor as dictated by the seed dispensing needs.

Planting unit 10 is merely exemplary. The seed meter disk assembly described herein maybe utilized with various different planting units without departing from the spirit of the invention.

Figure 2:
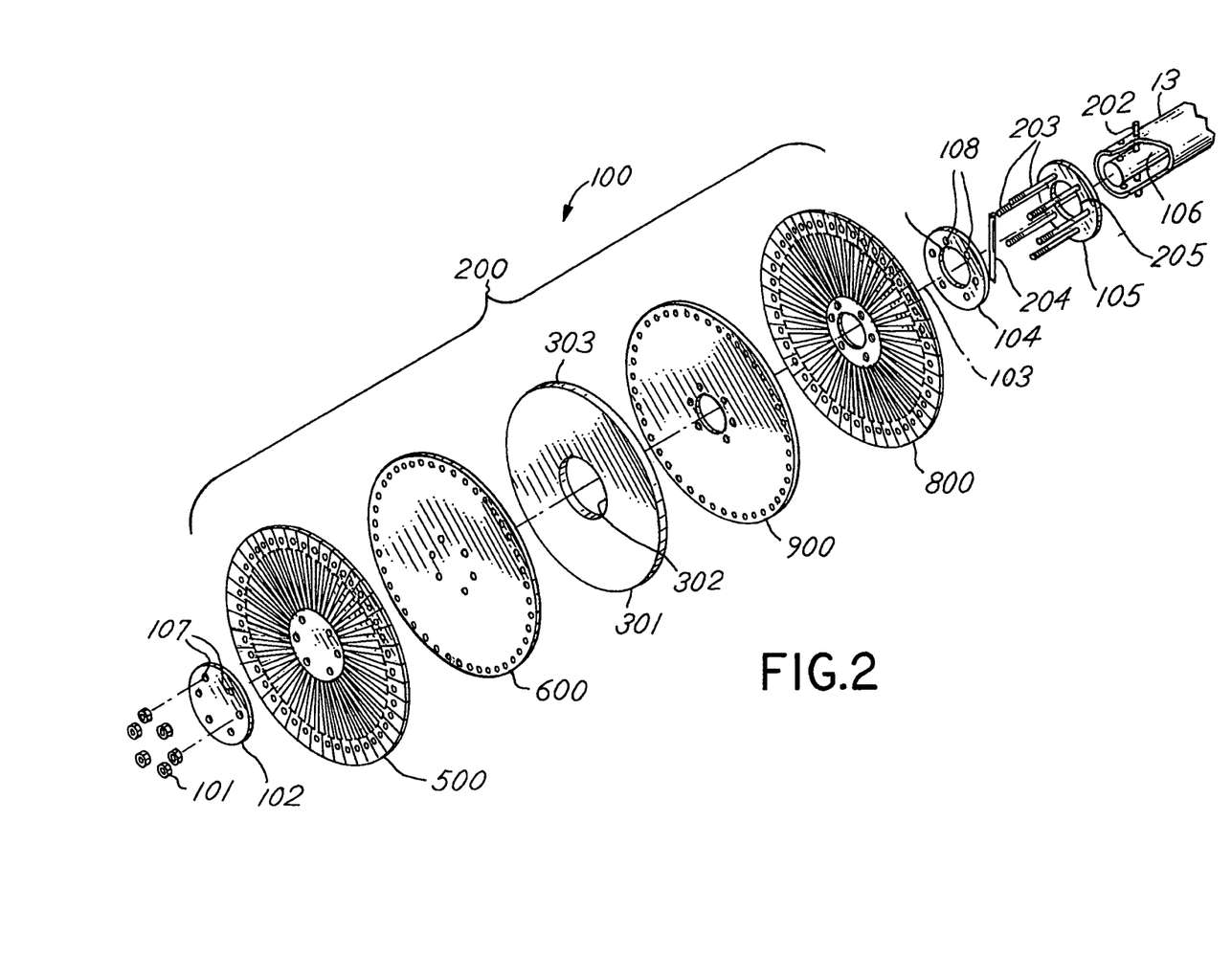
FIG. 2 is an exploded view of one embodiment of the seed meter disk assembly of FIG. 1.

FIG. 2 through FIG. 7 and FIG. 9 through FIG. 11 show a first embodiment of seed meter disk assembly 100. FIG. 2 is an exploded view of seed meter disk assembly 100 along center axis 103. Seed meter disk assembly 100 includes a plurality of fasteners 101, first assembly disk 102, first plurality of resilient arm members 500, first exterior surface 600, spacer 301, second exterior surface 900, second plurality of resilient arm members 800, second assembly disk 104, stop 204, rotatable mounting bracket 105, stop 202 and axle 106. Vacuum tube 13 circumferentially surrounds axle 106 when assembled and extends through rotatable mounting bracket 105, second assembly disk 104, second plurality of resilient arm members 800 and second exterior surface 900 into spacer 301.

The plurality of fasteners 101 shown in FIG. 2 are any fasteners known in the art, which rotatably mount seed meter disk assembly 100 along center axis 103 about axle 106.

As shown in FIG. 2, first assembly disk 102 is a circular disk. In the preferred embodiment, its external diameter is approximately 3.75 inches. First assembly disk 102 aids in the support or securement of the other components of seed meter disk assembly 100. First disk assembly 102 includes circumferentially spaced mounting apertures 107.

Figure 3:
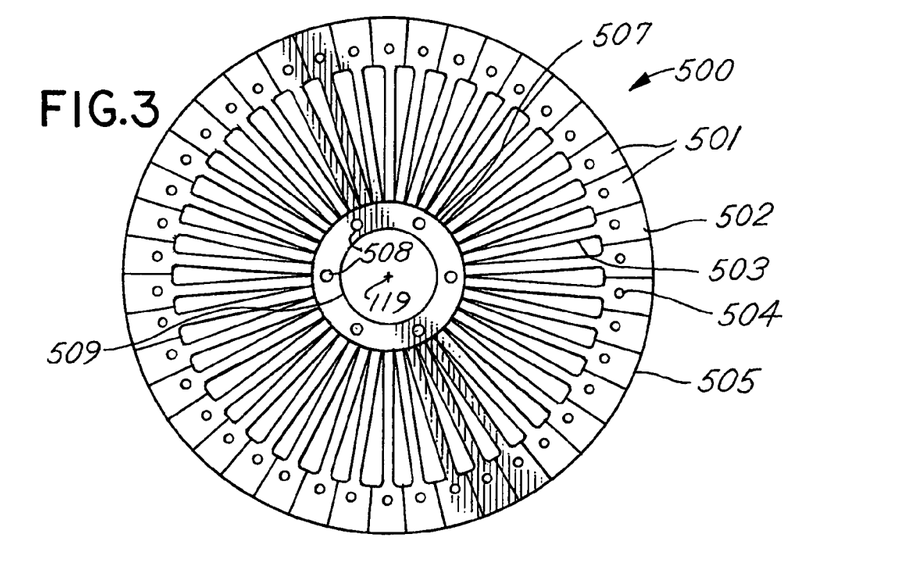
FIG. 3 is a right side view of a component of the seed meter disk assembly of FIG. 2.

FIG. 3 is a right side view of first plurality resilient arm members 500. First plurality resilient arm member 500 is composed of a plurality of radially extending individual first arm members 501 secured around center point 119. Center point 119 corresponds to central axis 103. In the preferred embodiment, each first arm member 501 is identical and shaped similar to a "spatula" as it has a first broad portion 502 and first stem 503. First broad portion 502 of each first arm member 501 contains first arm member seed apertures 504. Each first arm member seed apertures 504 on each first arm member 501 is uniformly spaced around first plurality resilient arm member 500. In the preferred embodiment, the diameter of each seed apertures is approximately 0.18 inches. In the preferred embodiment, the diameter of the first arm member seed apertures 504 through center point 119 is approximately 11 inches. In the preferred embodiment, the diameter of first outer edge 505 of each first arm member 501 through center point 119 is approximately 12.5 inches. First plurality resilient arm member 500 further comprises first plurality of mounting apertures 508. First plurality of mounting apertures 508 are spaced and sized to mate with plurality mounting apertures found on the other components of seed meter disk assembly 100 and are spaced between first middle diameter 507 and first inner diameter 509. In the preferred embodiment, the diameter of first middle diameter 507 through center point 119 is approximately 3.75 inches and the diameter of first inner diameter 509 through center point 119 is approximately 2.25 inches. In one embodiment, first plurality resilient arm member 500 is one single component with individually cut arm members. In another embodiment, first plurality resilient member 500 is composed of multiple and distinct arm members secured around center point 119, wherein each arm member is secured between first middle diameter 507 and first inner diameter 509 by means known in the art. First plurality resilient arm members 500 is preferably composed of a wear resistant, yet deformable, material such as steel, aluminum or plastic.

Figure 4:
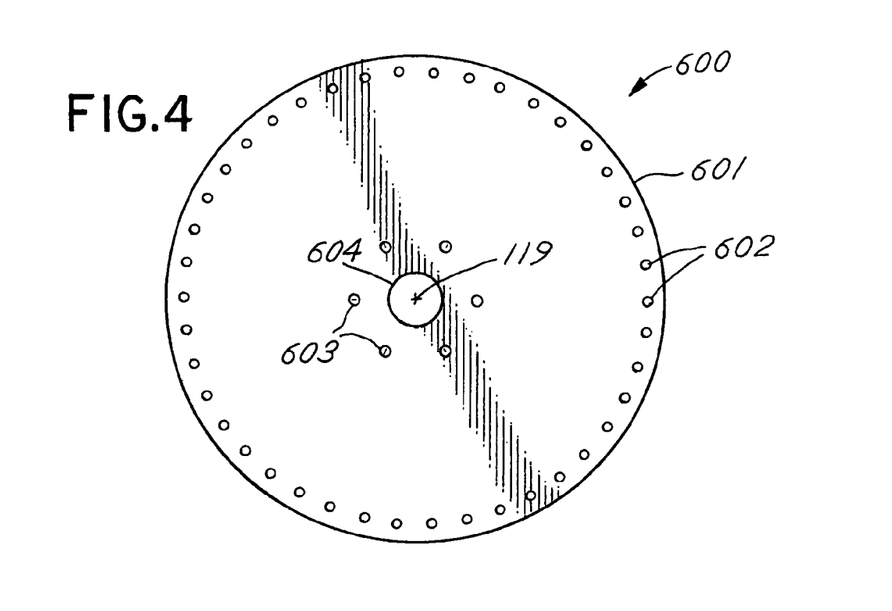
FIG. 4 is a right side view of a component of the seed meter disk assembly of FIG. 2.

FIG. 4 is a right side view of first exterior surface 600. First exterior surface 600 is a circular disk having a first outer diameter 601 and a first inner diameter 604. In the preferred embodiment, first outer diameter 601 through center point 119 is approximately 11.75 inches. In the preferred embodiment, first inner diameter 604 through center point 119 is approximately 1.375 inches. First exterior surface 600 includes first plurality of seed apertures 602 centered around center point 119. In the preferred embodiment, the seed apertures are circular and uniformly spaced around the circumference of the disk. In the preferred embodiment, the diameter of first plurality of seed apertures 602 is approximately 11 inches and the diameter of each seed apertures is approximately 0.18 inches. First exterior surface 600 also includes first plurality of mounting apertures 603. The pattern and diameter of the plurality mounting apertures is controlled by the pattern of the rotatable mounting bracket 105. In the preferred embodiment, first plurality of mounting apertures 603 are circumferentially spaced around the center of first exterior surface 600 and located on first exterior surface 600 at a diameter between about 2.25 inches and about 3.75 inches. First exterior surface 600 is preferably composed of a wear resistant material such as aluminum, steel or plastic.

As shown in FIG. 2, spacer 301 is a circular disk with an inner diameter 302 and an outer diameter 303. Inner diameter 302 must be greater than the diameter of the mounting apertures found on the other components of seed meter disk assembly 100. Outer diameter 303 must be less than first outer diameter 601 of first exterior surface 600 but greater than the diameter of first plurality of seed apertures 602.

Figure 5:
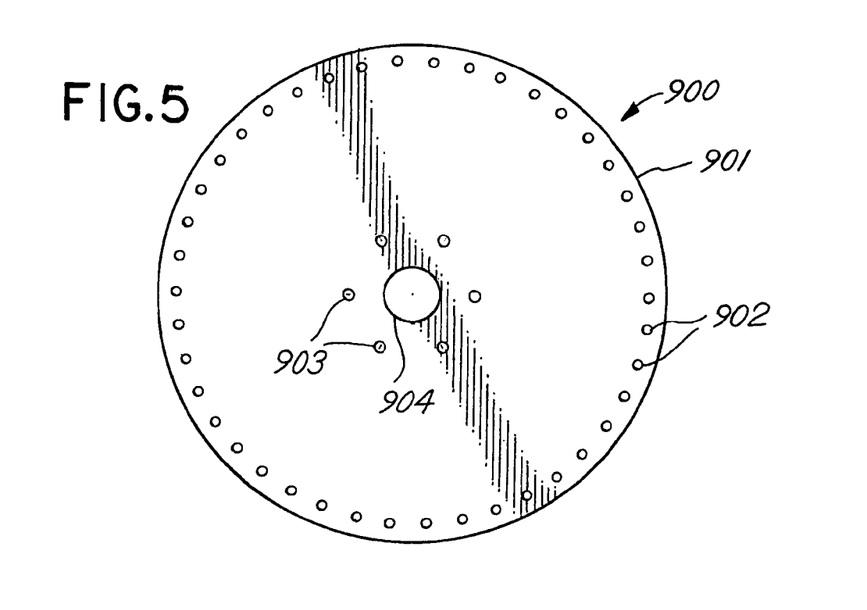
FIG. 5 is a right side view of a component of the seed meter disk assembly of FIG. 2.

FIG. 5 is a right side view of second exterior surface 900. Second exterior surface 900 incorporates many of the characteristics of first exterior surface 600. In the preferred embodiment, outer diameter 901 is approximately the same as first outer diameter 601, the arrangement, spacing and dimension of the plurality of seed apertures 902 are approximately the same as first plurality of seed apertures 602, and the location and size of the plurality of mounting apertures 903 are identical to first plurality of mounting apertures 603. Similarly, second exterior surface 900 is composed of material similar to first exterior surface 600. In other embodiments, the size of outer diameter 901 and the arrangement, spacing and dimension of the plurality of seed apertures 902 may vary from those of first exterior surface 600 depending on the planting constraints of the seed meter. Second exterior surface 900 also includes inner apertures 904. In the preferred embodiment, inner apertures 904 is approximately 1.375 inches. The size of inner apertures 904 may vary and is controlled by the diameters of axle 106 and vacuum tube 13.

Figure 6:
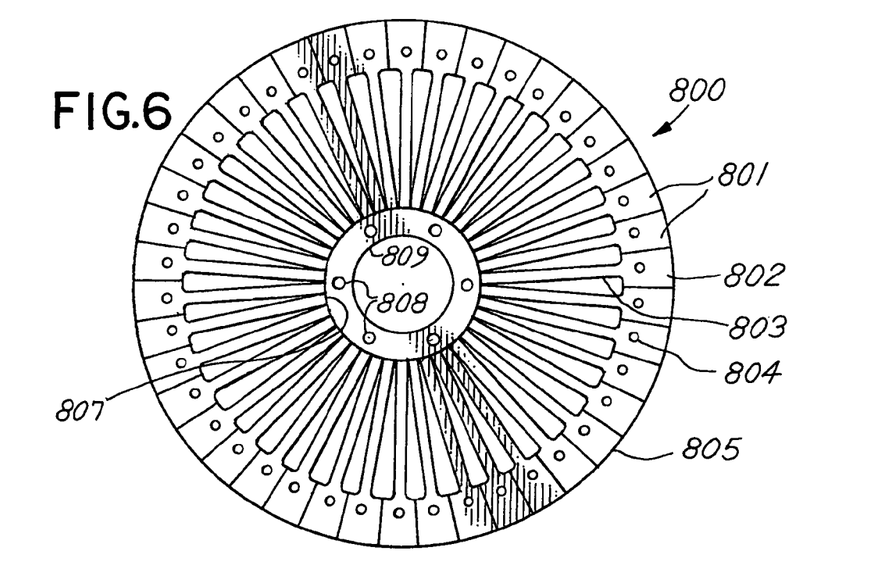
FIG. 6 is a right side view of a component of the seed meter disk assembly of FIG. 2.

FIG. 6 is a right side view of second plurality resilient arm members 800. Second plurality resilient arm members 800 incorporates many of the characteristics of first plurality resilient arm members 500. For example, in the preferred embodiment, the size, dimension and arrangement of the following components are approximately the same: second arm member 801 and first arm member 501; second broad portion 802 and first broad portion 502; second stem 803 and first stem 503; second seed arm member apertures 804 and first arm member seed apertures 504; second outer edge 805 and first outer edge 505; second middle diameter 807 and first middle diameter 507; and second plurality of mounting apertures 808 and first plurality of mounting apertures 508. Second plurality resilient arm members 800 also includes second inner apertures 809. In the preferred embodiment, the diameter of second inner apertures 809 is approximately 2.25 inches. The size of second inner apertures 809 may vary and is controlled by the diameters of axle 106 and vacuum tube 13.

As shown in FIG. 2, second assembly disk 104 is a circular disk with an external diameter of approximately 3.75 inches in the preferred embodiment. Second assembly disk 104 aids in the support or securement of the other components of seed meter disk assembly 100. Second disk assembly 104 includes circumferentially spaced mounting apertures 108 and inner apertures 201. Inner aperture 201 is sized to ensure it rotates about axle 106 and vacuum tube 13.

As shown in FIG. 2, rotatable mounting bracket 105 is a rotatable disk with a plurality of supports 203. The plurality of supports are sized to fit within plurality of mounting apertures 107, 108, 508, 603, 808, 903 and match the corresponding pattern of the apertures. Plurality of supports 203 mate with fasteners 101. Thus, the structure of the plurality of supports 203 and fasteners 101 must correlate. For example, if plurality of supports 203 are bolts then fasteners 101 must be a mating nut. Use of other similar structures known in the art may be utilized without departing from the spirit of the invention. Rotatable mounting bracket 105 also includes inner apertures 205. Inner apertures 205 is sized to ensure it rotates about axle 106 and vacuum tube 13.

In the preferred embodiment, rotatable drum 200 includes first plurality resilient arm member 500, first exterior surface 600, spacer 301, second plurality resilient arm member 800 and second exterior surface 900.

Figure 7:
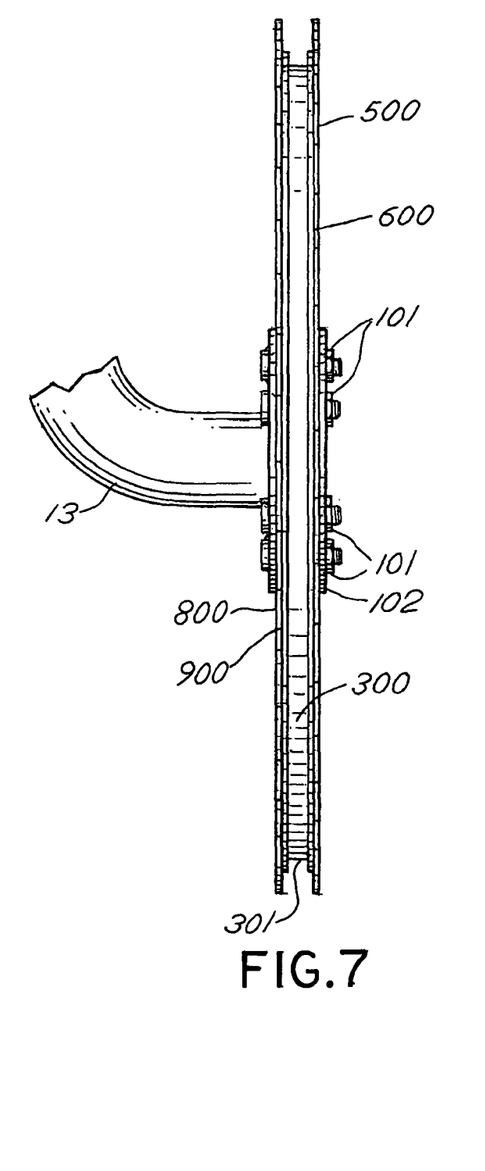
FIG. 7 is a front view of the assembled seed meter disk assembly of FIG. 2.

FIG. 7 is a right side view of assembled seed meter disk assembly 100. When assembled, rotatable mounting bracket 105 is secured between stops 202, 204. Plurality of supports 203 of rotatable mounting bracket 105 are placed through the plurality of mounting apertures 108 of second assembly disk 104, second plurality of mounting apertures 808 of second plurality resilient arm members 800, plurality of mounting apertures 903 of second exterior surface 900, through spacer 301, first plurality of mounting apertures 603 of first disk, first plurality of mounting apertures 508 of first plurality resilient arm members 500 and plurality of mounting apertures 107 of first assembly disk 102. Fasteners 101 are secured to plurality of supports 203 thereby rotatably securing the above referenced components to rotatable mounting bracket 105.

Vacuum tube 13 is a conduit which circumferentially surrounds axle 106 and extends through inner apertures 205 of rotatable mounting bracket 105, inner apertures 201 of second assembly disk 104, second inner apertures 809 of second plurality resilient arm members 800, inner apertures 904 of second exterior surface 900 and through inner diameter 302 of spacer 301. As shown in FIG. 7, when assembled, the arrangement of first exterior surface 600, spacer 301 and second exterior surface 900 forms an inner chamber 300. Vacuum tube 13 extends into inner chamber 300. Seals may be provided between inner apertures 205, 201, 809 or 904, or a combination thereof, to create a substantially air tight seal between inner chamber 300 and vacuum tube 13.

Figure 8:
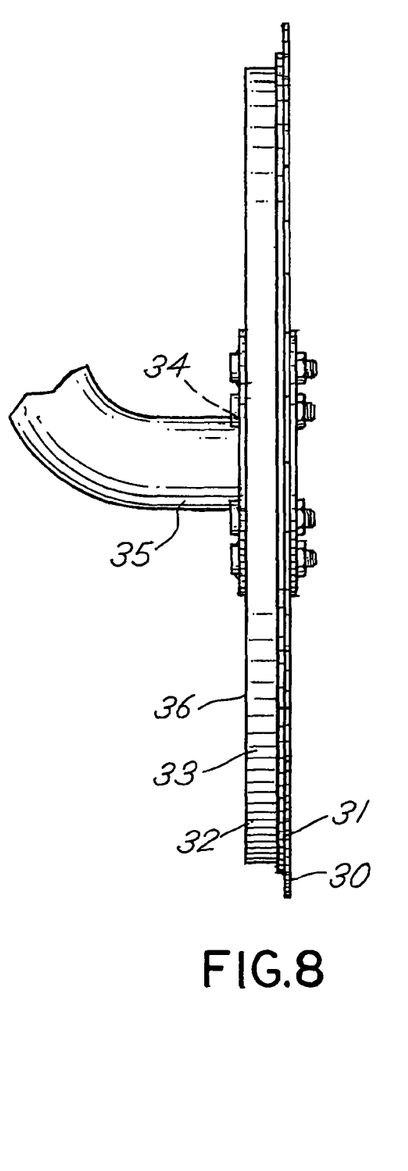
FIG. 8 is a front view of another embodiment.

FIG. 8 is side view of an additional embodiment of the present invention. In this embodiment, only one plurality resilient arm members 30 and exterior surface 31 is utilized. Additionally, side 36 of spacer 32 is solid absent inner apertures 34. Inner apertures 34 is sized to provide an airtight seal between the inner chamber 33 and the vacuum tube 35. In this embodiment, seals may also be utilized to aid in the creation of airtight seals.

Figure 9:
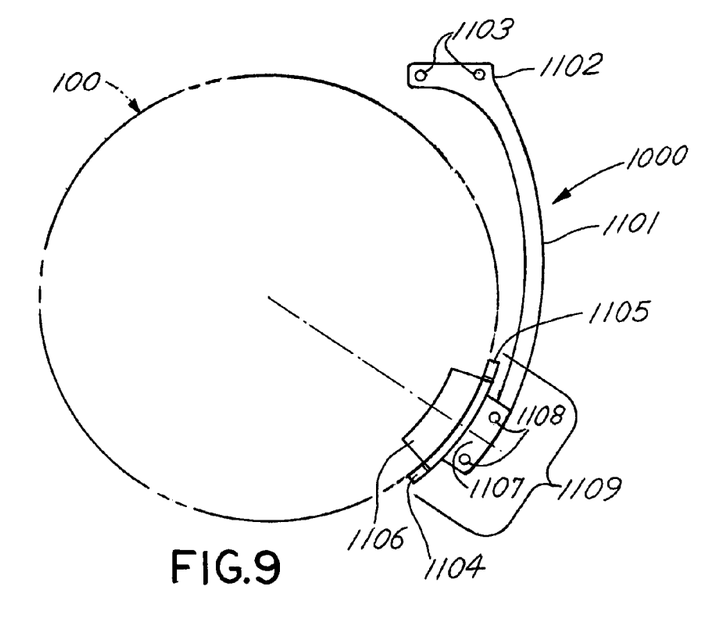
FIG. 9 is a right side view of the lifter used with seed meter disk assembly of FIG. 2.
Figure 10:
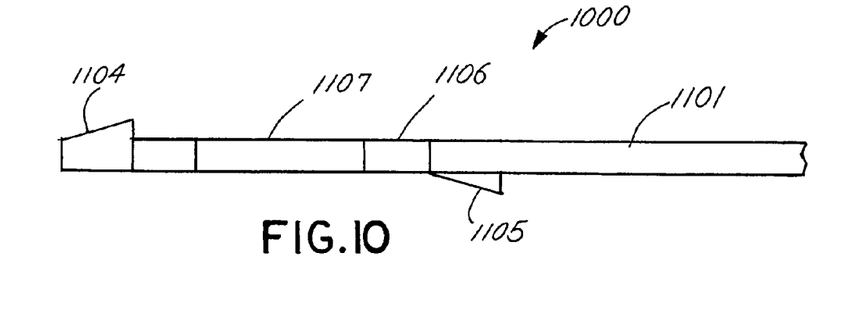
FIG. 10 is a front view of the lifter of FIG. 9.

FIG. 9 is a right side view of lifter 1000 and FIG. 10 is a front view of lifter 1000. Lifter 1000 is utilized to aid in the removal of the seeds from rotatable drum 200. Lifter 1000 includes member 1102. Lifter 1000 is secured to a frame (not shown) through mounting apertures 1103 on member 1102. Extending from member 1102 is arm 1101. Arm 1101 is curved and configured not to interfere with the rotation of rotatable drum 200, yet allow lifter 1000 to remove the seeds from the rotatable drum 200. In the preferred embodiment, lifting end 1109 includes base 1107, platform 1106, first vacuum breaker plate 1104 and second vacuum breaker plate 1105. Base 1107 is connected to arm 1101 through mounting apertures 1108. Connected with base 1107 is platform 1106. Platform 1106 is configured to slide between first exterior surface 600 and second exterior surface 900. Platform 1106 does not extend over any of the plurality of mounting apertures on the components of rotatable drum 200.

Connected with platform 1106 is first vacuum breaker plate 1104 and second vacuum breaker plate 1105. First vacuum breaker plate 1104 is a ramp like structure configured to engage the arm members of first plurality resilient arm members 500 or second plurality resilient arm members 800 to deform these away from exterior surfaces 600 or 900, respectively, so that communication with the vacuum source is disrupted and the seed is removed from each arm member. Second vacuum breaker plate 1105 is a ramp like structure configured to engage the arm members of first plurality resilient arm members 500 or second plurality resilient arm members 800 to deform away from exterior surfaces 600 or 900, respectively, so that communication with the vacuum source is disrupted and the seed is removed from each arm member. Not only do first and second vacuum breaker plates 1104, 1105, respectively, ensure that the seed is removed by disrupting communication with the vacuum source, but in some embodiments, these components also mechanically dislodge the individual seeds or debris from first plurality resilient arm members 500 or second plurality resilient arm members 800.

Lifting end 1109 is further configured to allow the first and second plurality of resilient arm members 500 or 800, respectively, to move back towards first and second exterior surfaces 600 and 900, respectively, when the resilient arm members are no longer engaged with the lifting end thereby reestablishing communication with the vacuum source. In this embodiment, first vacuum breaker plate 1104 removes the seed secured to first arm members 501 of first plurality resilient arm members 500 and second vacuum breaker plate 1105 removes the seed secured to second arm members 801 of second plurality resilient arm members 800. Such a correlation is not required and can be modified in other embodiments. Additionally, lifting end 1109 may comprise either more or fewer parts provided that the lifting end is capable of moving the plurality of resilient arm members away from the exterior surface of the disk when engaged with the lifting end and towards the exterior surface of the disk when disengaged from the lifting end. In other embodiments, the lifter may be modified to or include a portion to occlude the mounting apertures on first and second plurality resilient arm members 500 and 800, respectively, thereby disturbing communication with the vacuum source.

Figure 11:
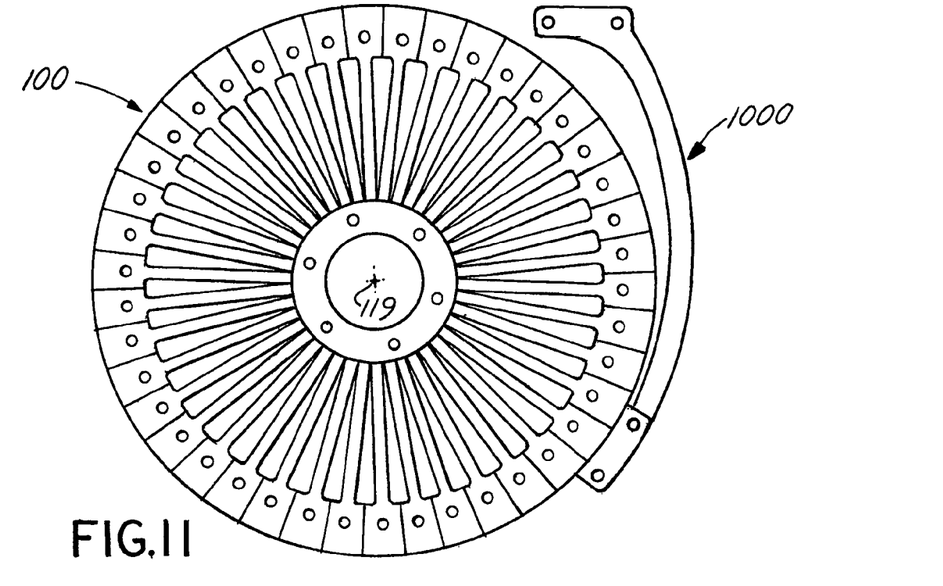
FIG. 11 is a right side view of the lifter of FIG. 9 shown in engagement with the seed meter disk assembly.

FIG. 11 shows the assembled seed disk meter assembly 100 along with lifter 1000. During use, a vacuum is created within inner chamber 300 or inner portion of seed meter disk assembly 100 by a vacuum source (not shown) through vacuum tube 13. At the same time, assembled seed meter disk assembly 100 rotates about axle 106. As feed meter assembly 100 rotates, the vacuum created inside inner chamber 300 causes a pressure difference between the exterior surfaces of first plurality resilient arm members 500, first exterior surface 600, second exterior surface 900 and second plurality resilient arm members 800 and inner chamber 300. This pressure differences urge individual seeds onto the seed apertures of first plurality of resilient arm members 500 and second plurality of resilient arm members 800 from the seeds inside the assembly cover. As first and second plurality of resilient arm members 500 and 800 travel over the first and second vacuum breaker plates 1104 and 1105 of lifter 1000, lifter 1000 disrupts the vacuum source between these surfaces and inner chamber 300 causing the individual seeds to be timely removed from seed meter disk assembly 100. The seeds then exit through a seed dispensing tube and are planting in the ground by the remaining components of the planting unit. As first and second plurality of resilient arm members 500 and 800 become disengaged from first and second vacuum breaker plates 1104 and 1105, the resilient nature of the arms further aid in the removal of any seeds or seed remnants still lodged in the apertures of seed meter disk assembly 100 that just traveled over the lifter. After the first or second plurality of resilient arm members 500 or 800, respectively, are no longer engaged with the lifter, communication with the vacuum source is reestablished and a new seed is deposited against the seed apertures as a result of the pressure differential.

In one embodiment, first plurality resilient arm members 500 and second plurality resilient arm members 800 are arranged so that the individual arm members of each are aligned. In another embodiment, the individual arm members are offset.

In the embodiment described in FIGS. 2-11, seed meter disk assembly 100 includes first assembly disk 102 and second assembly disk 104. In other embodiments, such components may be omitted provided that lifter 1000 sufficiently deforms first plurality resilient arm members 500 and second plurality resilient arm members 800 to disrupt the communication with the vacuum source thereby allowing the individuals seeds to be removed.

The embodiment described in FIGS. 2-11, seed meter disk assembly 100 includes fasteners 101, stops 202 and 204 and rotatable mounting bracket 105. In other embodiments, such components may be omitted and replaced by other parts known in the art provided that the remainder of the seed meter disk assembly rotates about axle 106 and sufficient vacuum pressure is exerted into the inner chamber to removably secure the seeds to the assembly.

Additional embodiments of components of a seed meter disk assembly are shown in FIG. 12 through FIG. 19.

Figure 12:
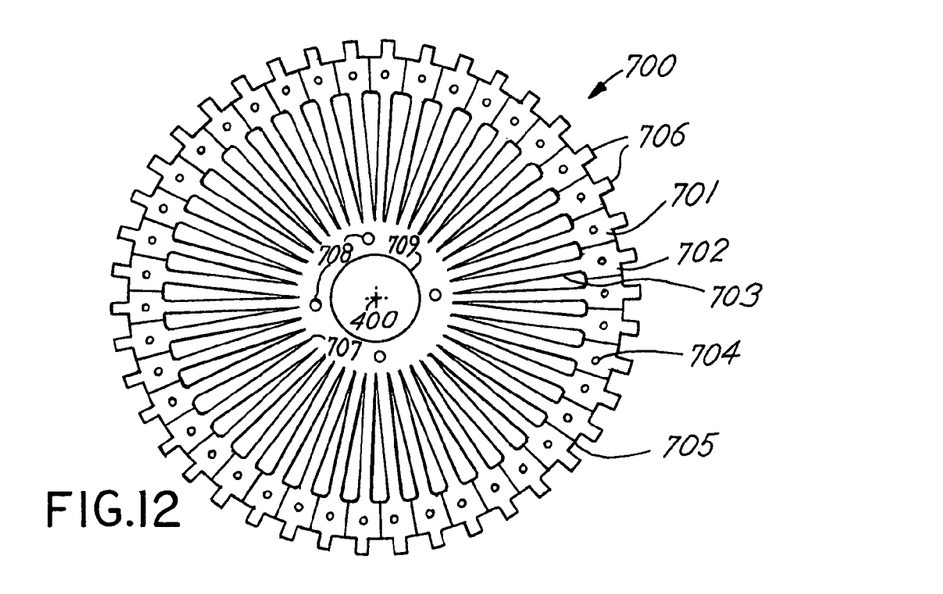
FIG. 12 is a right side view of a component of another embodiment of the present invention.

FIG. 12 is right side view of another embodiment of first plurality resilient arm members 700. This component replaces first plurality resilient arm member 500 as described in the embodiment shown in FIG. 2 through FIG. 11. First plurality resilient arm member 700 is composed of a plurality of radially extending individual first arm member 701 secured around center point 400. In the preferred embodiment, each first arm member 701 is identical and shaped similar to a "spatula" as it has a first broad portion 702, first stem 703. First broad portion 702 of each first arm member 701 contains first arm member seed apertures 704 and projection 706. Projection 706 is a tab extending from first arm member 701. In the preferred embodiment, it is rectangular. In other embodiments, however, the projection may be different sizes and shapes provided that it allows the lifter to move each first arm member 701 away from the inner chamber so that communication with the vacuum source is disrupted. Each first arm member seed apertures 704 on each first arm member 701 is uniformly spaced around first plurality resilient arm member 700. In the preferred embodiment, the diameter of each seed arm member apertures is approximately 0.160 inches. First plurality resilient arm member 700 further comprises first plurality of mounting apertures 708. First plurality of mounting apertures 708 are spaced and sized to mate with plurality mounting apertures found on the other components of the seed meter disk assembly and are spaced between ends 707 of first stem 703 and first inner diameter 709. In one embodiment, first plurality resilient arm member 700 is one single component with individually cut arm members. In another embodiment, first plurality resilient member 700 is composed of multiple and distinct arm members secured around center point 400, wherein each arm member is secured between ends 707 of first stem 703 and first inner diameter 709 by means known in the art. First plurality resilient arm members 700 is preferably composed of a wear resistant, yet deformable, material such as steel, aluminum or plastic. In the preferred embodiment, the diameter of the outside edge of projections 706 through center point 400 is approximately 12.75 inches, the diameter along first outer edge 705 through center point 400 is approximately 12 inches and the diameter through center point 400 formed by the plurality of seed apertures 704 is approximately 11 inches.

When first plurality resilient arm member 700, replaces first plurality resilient arm member 500 as described in the embodiment shown in FIG. 2 through FIG. 11, a second plurality resilient arm member also replaces second plurality resilient arm member 800. The second plurality resilient arm member in this embodiment is identical to first plurality resilient arm member 700 except first inner diameter 709 is replaced with an apertures as in second plurality resilient arm member 800.

Figure 13:
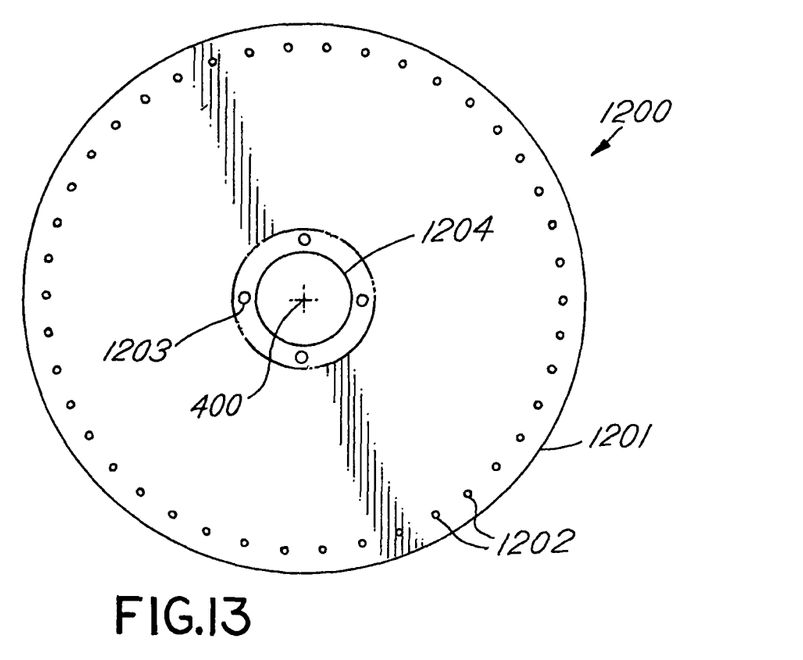
FIG. 13 is a right side view of a component of another embodiment of the present invention.

FIG. 13 is a right side view of first exterior surface 1200. This component replaces first exterior surface 600 as described in the embodiment shown in FIG. 2 through FIG. 11. First exterior surface 1200 is a circular disk having a first outer diameter 1201 and a first inner diameter 1204. In the preferred embodiment, first outer diameter 1201 through center point 400 is approximately 12 inches. In the preferred embodiment, first inner diameter 1204 through center point 119 is approximately 2 inches. First exterior surface 1200 includes first plurality of seed apertures 1202 through center point 400. In the preferred embodiment, the seed apertures are circular and uniformly spaced around the circumference of the disk. In the preferred embodiment, the diameter of first plurality of seed apertures 1202 is approximately 11.25 inches and the diameter of each seed apertures is approximately 0.17 inches. First exterior surface 1200 also includes first plurality of mounting apertures 1203. The pattern and diameter of the plurality mounting apertures are controlled by the pattern of the rotatable mounting bracket. In the preferred embodiment, first plurality of mounting apertures 1203 are circumferentially spaced around the center of first exterior surface 1200 and located on first exterior surface 1200 at a diameter between about 2 inches and about 3.75 inches. First exterior surface 1200 is preferably composed of a wear resistant material such as aluminum, steel or plastic.

When first exterior surface 1200, replaces first exterior surface 600 as described in the embodiment shown in FIG. 2 through FIG. 11, a second exterior surface also replaces second exterior surface 900. The second exterior surface in this embodiment is identical to first exterior surface 1200 except first inner diameter 1204 is replaced with an apertures as in second exterior surface 900.

Figure 14:
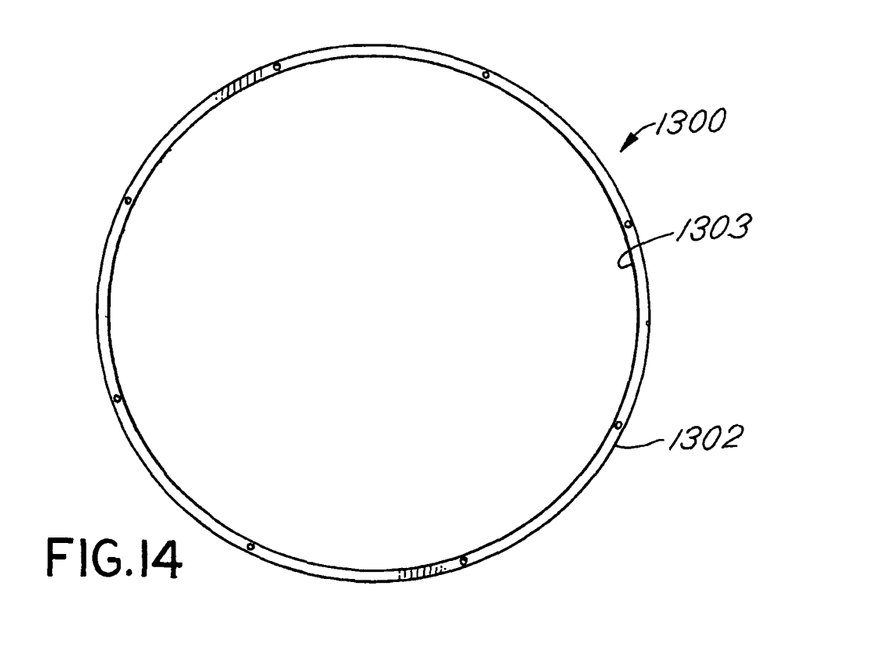
FIG. 14 a right side view of a component of another embodiment of the present invention.

FIG. 14 is a right side view of spacer 1300. This component replaces first exterior surface 300 as described in the embodiment shown in FIG. 2 through FIG. 11. Spacer 1300 includes outer diameter 1302 and inner diameter 1303. In the preferred embodiment, the diameter of outer diameter 1302 through center point 400 is approximately 11.75 inches and the diameter of inner diameter 1303 through center point 400 is approximately 11.25 inches. The diameters inner diameter 1302 and outer diameter 1303 may vary provided that outer diameter 1302 is greater than the diameter formed by the plurality of seed apertures 704 and inner diameter 1302 is greater than inner diameter 1204.

Figure 15:
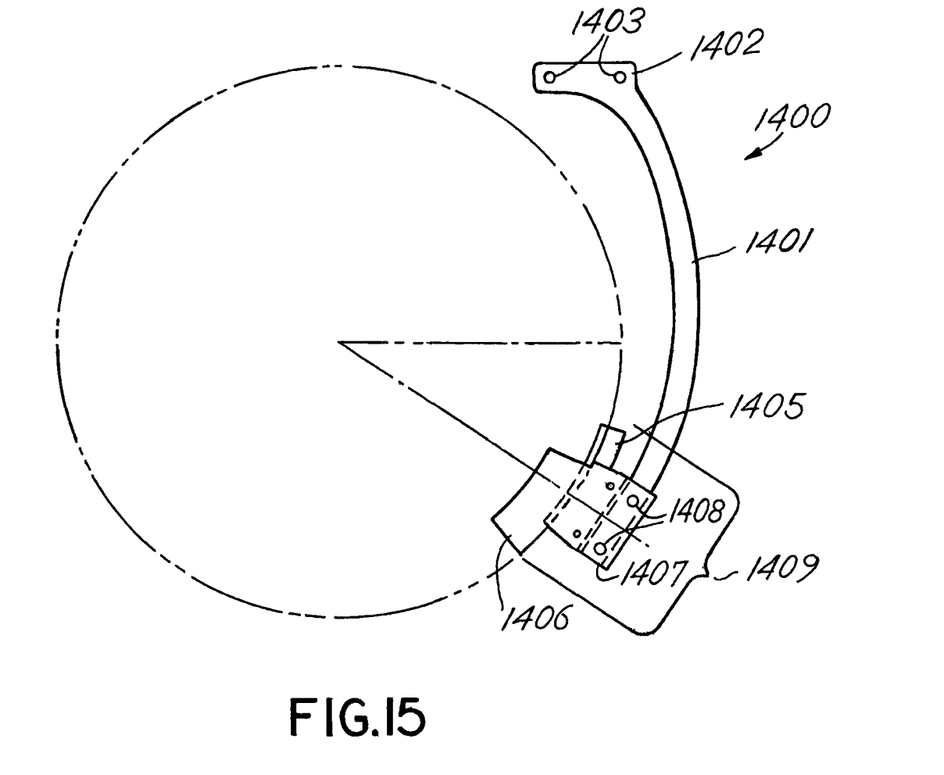
FIG. 15 is a right side view of another lifter embodiment.
Figure 16:
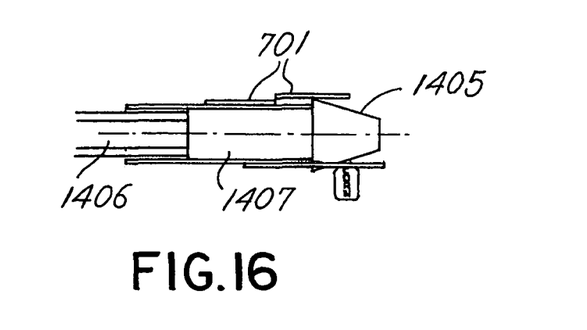
FIG. 16 a top view of the lifter embodiment shown in FIG. 15.

FIG. 15 is a right side view of lifter 1400 and FIG. 16 is a top view of lifter 1400. Lifter 1400 is utilized to aid in the removal of the seeds from the rotatable drum. Lifter 1400 includes member 1402. Lifter 1400 is secured to a frame (not shown) through mounting apertures 1403 on member 1402. Extending from member 1402 is arm 1401. Arm 1401 is curved and configured not to interfere with the rotation of the rotatable drum, yet allow lifter 1400 to aid in the removal of seeds from the rotatable drum. In the preferred embodiment, lifting end 1409 includes base 1407, platform 1406, and vacuum breaker plate 1405. Base 1407 is connected to arm 1401 through mounting apertures 1408. Connected with base 1407 is platform 1406. Platform 1406 is configured to slide between the first exterior surface and the second exterior surface. Platform 1406 does not extend over any of the plurality of mounting apertures on the components of the rotatable drum. Connected with platform 1406 is vacuum breaker plate 1405. Vacuum breaker plate 1405 is a ramp like structure configured to engage the arm members of first plurality resilient arm members or second plurality resilient arm members to deform these away from the exterior surfaces, so that communication with the vacuum source is disrupted and the seed is removed from each arm member. Vacuum breaker plate 1405 may also mechanically dislodge the individual seeds or debris from the first and second exterior surfaces.

In the preferred embodiment, the vacuum source is sufficiently disrupted to disengage the seed when the vacuum breaker plate 1405 deforms resilient arm approximately 0.07 inches. In one embodiment the resilient arm may be deformed a sufficient distance from the exterior surfaces such that the seed is removed from the resilient arm. In one embodiment, for example, at least one of the plurality of individual first arm members 701 may move a distance away from the first exterior surface 1200 so as to contact an exterior surface of vacuum breaker plate 1405. In another example, at least one of a plurality of individual second arm members may move a distance away from the second exterior surface so as to contact an exterior surface of vacuum breaker plate 1405. As shown in FIG. 16, the top of the plate 1405 is trapezoidal. Such configuration allows the same guide to aid in the removal of seeds from the first exterior surface and the second exterior surface.

Lifting end 1409 is further configured to allow the first and second plurality of resilient arm members to move back towards the first and second exterior surfaces, respectively, when the resilient arm members are no longer engaged with the lifting end thereby reestablishing communication with the vacuum source. Additionally, lifting end 1409 may comprise either more or fewer parts provided that the lifting end is capable of moving the plurality of resilient arm members away from the exterior surface of the disk when engaged with the lifting end and towards the exterior surface of the disk when disengaged from the lifting end. In other embodiments, the lifter may be modified to or include a portion to occlude the mounting apertures on first and second plurality resilient arm members, respectively, thereby disturbing communication with the vacuum source.

Figure 17:
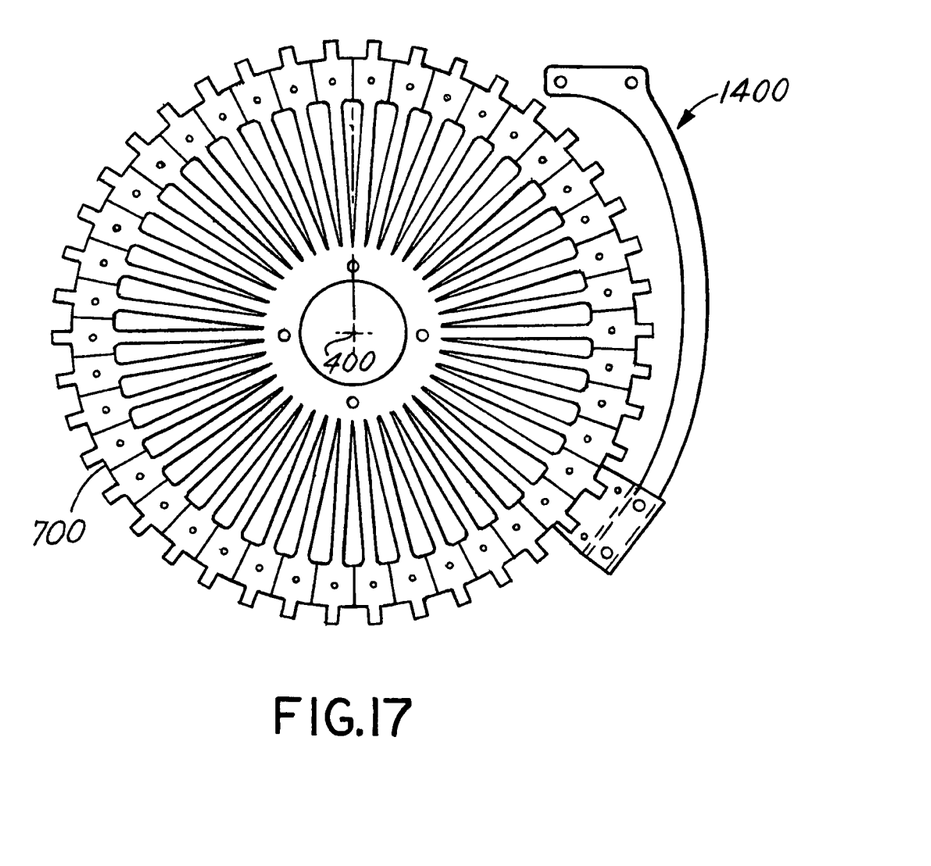
FIG. 17 is a right side view of the lifter of FIG. 15 shown in engagement with the embodiment shown in FIGS. 12-14.

FIG. 17 shows the assembled seed disk meter assembly with the components described in FIG. 12-FIG. 16. In use, the embodiment described in FIG. 12-FIG. 16 operates similarly to the embodiment described in FIG. 2-FIG. 11.

I claim:

1. A seed meter disk assembly for a seed meter to dispense individual seeds at desired intervals, the seed meter disk assembly comprising:

a rotatable drum having an inner chamber and a planar exterior surface, the inner chamber being in communication with a vacuum source and the exterior surface defining an annular circumferential periphery including a plurality of circumferentially spaced seed apertures connecting the inner chamber and the exterior surface;

a plurality of resilient arm members, each of the arm members having a first end secured about a radially inward portion of the exterior surface of the drum, each of the arm members also extending radially outward from the radially inward portion to an outer free end detached from the exterior surface, the outer free end defining an arm member aperture, each of the arm member apertures at least partially overlaid with a corresponding seed aperture;

a lifter having a lifting end, the lifting end being engaged with the drum such that the drum is rotatable relative to the lifting end, the lifting end adapted to urge the outer free end of the plurality of arm members away from the exterior surface of the drum as arm members are engaged therewith, the lifter further adapted to allow the outer free end of the arm members to move towards the seed disk as the arm members are disengaged from the lifter.

2. The seed meter disk assembly of claim 1, wherein the rotatable drum defines a central axis and the inner chamber communicates with the vacuum source by way of a conduit disposed about the central axis.

3. The seed meter disk assembly of claim 1, wherein the lifter is adapted to occlude each of the plurality of seed apertures engaged therewith.

4. The seed meter disk assembly of claim 1, wherein the lifter is adapted to dislodge an individual seed from the plurality of seed apertures.

5. The seed meter disk assembly of claim 1, wherein the lifter is adapted to urge the outer free end of the plurality of arm members away from the exterior surface of the drum a distance permitting the outer free end to contact an outer surface of the lifting end.

6. The seed meter disk assembly of claim 5, wherein the seed apertures of the first exterior surface are circumferentially offset relative to the seed apertures of the second exterior surface.

7. The seed meter disk assembly of claim 1, wherein the rotatable drum defines a first exterior surface and a second exterior surface, the first exterior surface defining a plurality of circumferentially spaced seed apertures connecting the inner chamber and the first exterior surface, and the second exterior surface defining a plurality of circumferentially spaced seed apertures connecting the inner chamber and the second exterior surface.

8. A seed meter disk assembly for a seed meter to dispense individual seeds at desired intervals, the seed meter disk assembly comprising:

a rotatable drum member defining an interior portion and a circular planar exterior surface, the interior portion in operable communication with a vacuum source, the planar exterior surface including a plurality of circumferentially spaced seed apertures about a periphery thereof, wherein the plurality of seed apertures connect the interior portion to the exterior surface;

a plurality of resilient arm members radially positioned on the exterior surface, and having a first end portion secured to the exterior surface and a second end portion detached from the exterior surface, the second end portion being positioned radially outward of the first end portion and defining at least one arm member aperture adapted to communicate with the vacuum source by way of one of the plurality of seed apertures;

a lifting member including a raising member, the raising member being engageable with the second end portion of each of the plurality of resilient arm members as the drum member is rotated such that when engaged the second end portion of each of the plurality of resilient arm members is moved away from the exterior surface and communication of the arm member aperture with the vacuum source is disrupted.

9. The seed meter disk assembly of claim 8, wherein the rotatable drum member defines a central axis and the interior portion communicates with the vacuum source by way of a conduit disposed about the central axis.

10. The seed meter disk assembly of claim 8, wherein the lifting member is adapted to occlude each of the plurality of seed apertures as it is engaged therewith.

11. The seed meter disk assembly of claim 8, wherein the lifting member is adapted to dislodge an individual seed from the plurality of seed apertures.

12. The seed meter disk assembly of claim 8, wherein the lifting member is adapted to urge the second end portion of the plurality of arm members away from the exterior surface a distance permitting the outer free end to contact an outer surface of the raising member.

13. The seed meter disk assembly of claim 8, wherein the rotatable drum member defines a first exterior surface and a second exterior surface, the first exterior surface defining a plurality of circumferentially spaced seed apertures connecting the interior portion and the first exterior surface, and the second exterior surface defining a plurality of circumferentially spaced seed apertures connecting the interior portion and the second exterior surface.

14. The seed meter disk assembly of claim 13, wherein the seed apertures of the first exterior surface are circumferentially offset relative to the seed apertures of the second exterior surface.

15. The seed meter disk assembly of claim 14, wherein the lifter is adapted to occlude each of the plurality of seed apertures engaged therewith.

16. The seed disk assembly of claim 14, wherein the lifter is adapted to dislodge an individual seed from the plurality of seed apertures.

17. The seed meter disk assembly of claim 14, wherein the lifter is adapted to urge the outer free end of the plurality of arm members away from the exterior surface of the drum a distance permitting the outer free end to contact an outer surface of the at least one raising member.

18. The seed meter disk assembly of claim 14, wherein the seed apertures of the first exterior surface are circumferentially offset relative to the seed apertures of the second exterior surface.

19. A seed meter disk assembly for a seed meter to dispense individual seeds at desired intervals, the seed meter disk assembly comprising:

a drum defining a central axis and rotatable about the central axis, the drum further defining an inner chamber adapted to operative communicate with a vacuum source by way of a conduit disposed about the central axis, the drum further defining a pair of circular planar exterior surfaces positioned parallel to each other, each of the circular planar exterior surfaces defining a plurality of circumferential spaced seed apertures evenly spaced about a periphery of the respective exterior surface, the seed apertures connecting the inner chamber and the exterior surfaces;

a plurality of resilient arm members radially positioned on the pair of exterior surface and having a first end portion secured therewith and a second end portion detached therefrom, each second end portion being positioned radially outward of the first end portion and defining at least one arm member aperture adapted to communicate with the vacuum source by way of one of the plurality of seed apertures;

a lifting member including at least one raising member, the raising member being engageable with the second end portion of each of the plurality of resilient arm members as the drum member is rotated such that when engaged the second end portion of each of the plurality of resilient arm members is moved away from the exterior surface and communication of the arm member aperture with the vacuum source is disrupted.

* * * * *